(12) United States Patent
Park

(10) Patent No.: US 11,365,296 B2
(45) Date of Patent: Jun. 21, 2022

(54) NANOSILICA-CONTAINING THERMOPLASTIC HOT-MELT FILM HAVING EXCELLENT BONDING STRENGTH

(71) Applicant: Heedae Park, Busan (KR)

(72) Inventor: Heedae Park, Busan (KR)

( * ) Notice: Subject to any disclaimer, the term of this patent is extended or adjusted under 35 U.S.C. 154(b) by 88 days.

(21) Appl. No.: 16/126,851

(22) Filed: Sep. 10, 2018

(65) Prior Publication Data

US 2019/0085141 A1 Mar. 21, 2019

(30) Foreign Application Priority Data

Sep. 15, 2017 (KR) .................. 10-2017-0118659
Apr. 25, 2018 (KR) .................. 10-2018-0048102
Aug. 14, 2018 (KR) .................. 10-2018-0095116

(51) Int. Cl.
| | |
|---|---|
| *C08J 5/18* | (2006.01) |
| *C08L 75/04* | (2006.01) |
| *C08G 18/04* | (2006.01) |
| *C09J 7/35* | (2018.01) |
| *C08K 3/36* | (2006.01) |

(52) U.S. Cl.
CPC ............... *C08J 5/18* (2013.01); *C08G 18/04* (2013.01); *C08L 75/04* (2013.01); *C09J 7/35* (2018.01); *C08G 2170/20* (2013.01); *C08J 2335/02* (2013.01); *C08J 2367/00* (2013.01); *C08J 2375/04* (2013.01); *C08J 2377/00* (2013.01); *C08K 3/36* (2013.01); *C08K 2201/011* (2013.01); *C09J 2301/304* (2020.08); *C09J 2301/408* (2020.08); *C09J 2431/00* (2013.01); *C09J 2467/00* (2013.01); *C09J 2475/00* (2013.01); *C09J 2477/00* (2013.01)

(58) Field of Classification Search
CPC ............. C08J 5/18; C08L 75/04; C08G 18/04
USPC ....................................................... 524/492
See application file for complete search history.

(56) References Cited

U.S. PATENT DOCUMENTS

| | | | | |
|---|---|---|---|---|
| 3,362,036 | A | * 1/1968 | Reyer ................ | B29B 13/022 12/142 R |
| 4,156,676 | A | * 5/1979 | Bacskai ............. | C09J 167/04 524/493 |
| 2007/0129480 | A1 | 6/2007 | Nowak et al. | |
| 2011/0088285 | A1* | 4/2011 | Dojan .............. | A43B 23/0215 36/87 |
| 2015/0077873 | A1* | 3/2015 | Johnson ............ | C09D 5/004 359/871 |

FOREIGN PATENT DOCUMENTS

| | | | |
|---|---|---|---|
| CN | 107151539 A | | 9/2017 |
| JP | H1161067 | * | 3/1999 |
| JP | 102501544 | * | 6/2012 |
| KR | 10-2006-0126672 B1 | | 12/2006 |
| KR | 10-0865692 B1 | | 10/2008 |
| KR | 10-2014-0147631 A | | 12/2014 |
| KR | 10-2015-0005092 A | | 1/2015 |
| KR | 1020090117917 A | | 11/2019 |
| WO | WO 2001/053389 A1 | * | 7/2001 |
| WO | WO 2017208238 A1 | | 12/2017 |

OTHER PUBLICATIONS

Communication of Brazilian Patent Application No. 112019023816, dated Aug. 14, 2020, which corresponds to this application.
Communication of office Action of Brazilian Patent Application No. 112019023816, dated May 25, 2021, which corresponds to this application.

* cited by examiner

*Primary Examiner* — Deve V Hall
(74) *Attorney, Agent, or Firm* — Goldilocks Zone IP Law

(57) ABSTRACT

Disclosed is a nanosilica-containing thermoplastic hot-melt film having excellent bonding strength, which may be inserted between fabrics to adhere them to each other and may be distributed uniformly on the surfaces of both the fabrics without excessively penetrating into one of the fabrics after melting by heat and pressure during no-sew pressing even if the yarn density of the fabrics is high or low or even if the hole diameter of the fabrics is large or small, thereby increasing the bonding strength between the fabrics.

15 Claims, 15 Drawing Sheets

NANOSILICA-CONTAINING THERMOPLASTIC HOT-MELT FILM HAVING EXCELLENT BONDING STRENGTH

CROSS-REFERENCE TO RELATED APPLICATION

This application claims the benefit of Korean Patent Application No: 10-2017-0118659, filed on Sep. 15, 2017, Korean Patent Application No: 10-2018-0048102, filed on Apr. 25, 2018, and Korean Patent Application No: 10-2018-0095116, filed on Aug. 14, 2018 in the Korean Intellectual Property Office, the disclosures of which are incorporated herein in their entireties by references.

BACKGROUND OF THE INVENTION

Field of the Invention

The present invention relates to a nanosilica-containing thermoplastic hot-melt film having excellent bonding strength, and more particularly to a nanosilica-containing thermoplastic hot-melt film having excellent bonding strength, which may be inserted between adherents (e.g., fabric and fabric) to adhere them to each other and may be distributed uniformly on the surfaces of both the fabrics without excessively penetrating into one of the fabrics after melting by heat and pressure during no-sew pressing even if the yarn density of the fabrics is high or low or even if the hole diameter of the fabrics is large or small, thereby maximizing the adhesion between the fabrics.

Description of the Prior Art

In recent years, in the footwear manufacturing field, a lot of efforts have been made to reduce manufacturing costs, as in various industrial fields. As part of these efforts, there have been attempts to reduce or eliminate a sewing process that requires a lot of manpower, and these attempts have actually been applied in some areas. This is to replace the sewing processes, which accounts for a large part of the manufacturing cost, with an adhesive process, thereby increasing the production per person and shortening the process time, thereby reducing the cost.

Meanwhile, in a conventional adhesive process, a liquid-state adhesive is applied to adherents (hereinafter referred to as "fabrics"), and then the fabrics are adhered to each other in a state in which solvent or water has been volatilized by drying. This adhesive process has an advantage over the sewing process in that the process time and the number of workers can be reduced. However, efforts to reduce manufacturing costs are not limited to this adhesive process, and a process has further been applied, in which fabrics are adhered to each other by heat pressing using a film-type hot-melt (hereinafter referred to as "thermoplastic hot-melt film") instead of using a liquid-state adhesive.

Thermoplastic hot-melt films are used in the footwear manufacturing field due to their environmentally friendly characteristics and convenience of use and for the purpose of reducing costs, and examples thereof include thermoplastic polyurethane (TPU) hot-melt films, polyamide hot-melt films, ethylene-vinyl acetate (EVA) hot-melt films, polyester hot-melt films, and the like. Among these films, TPU hot-melt films and EVA hot-melt films are mainly used. These thermoplastic hot-melt films have advantages in that they show good productivity due to their film extrusion workability, are environmentally friendly due to being free of solvent, and have excellent bonding strength and physical properties and good touch feeling. In addition, thermoplastic hot-melt films having a thickness of 0.2 mm or more are mainly used in order to ensure adhesion to various fabrics (e.g., engineered meshes, sandwich meshes, lining fabrics, etc.).

However, conventional thermoplastic hot-melt films are generally manufactured to have a thickness of 0.2 mm or more in order to ensure excellent bonding strength. For this reason, when the hot-melt film is placed between fabrics and subjected to no-sew pressing, there are disadvantages in that the fabric product becomes heavy, has considerably hard touch feeling, and cannot meet the development trend of the footwear industry, which is getting lighter and lighter.

In particular, as described above, the conventional hot-melt-films have the problem of having a thick film thickness (0.2 mm or more). In addition to this problem, when no-sew pressing is performed in a state in which the thermoplastic hot-melt film is inserted between fabrics, a problem arises in that an excessive amount of the hot-melt film flows into the fabric having a relatively thick thickness and a relatively large hole diameter and the hot-melt film is not present at the adhesive interface, eventually causing adhesive failure. Namely, when a fabric having a relatively large hole diameter is adhered to a fabric having a relatively small hole diameter or when a fabric having a relatively high yarn density is adhered to a fabric having a relatively low yarn density or when different kinds of fabrics are adhered to each other by a hot-melt film, the hot-melt film is excessively penetrated into one of the fabrics by heat and pressure. Specifically, the hot-melt film melts and flows into the fabric having a relatively large hole diameter or a relatively low yarn density, and thus the hot-melt film does not remain on the remaining fabric (adhesive interface), causing adhesive failure.

PATENT DOCUMENTS

Patent Document 1: Korean Patent Application Publication No. 10-2015-0005092 (entitled "Thermoplastic polyurethane hot-melt film; published on Jan. 14, 2015);

Patent Document 2: Korean Patent Application Publication No. 10-2014-0147631 (entitled "Method for manufacturing thermoplastic polyurethane hot-melt film and thermoplastic hot-melt film manufactured by the method"; published on Dec. 30, 2014);

Patent Document 3: Korean Patent No. 10-0865692 (entitled "Hot-melt film and manufacturing method thereof; published on Oct. 28, 2008);

Patent Document 4: Korean Patent Application Publication No. 10-2006-0126672 (entitled "Hot-melt type adhesive composition"; published on May 8, 2006).

SUMMARY OF THE INVENTION

The present invention has been made in order to solve the above-described problems, and it is an object of the present invention to provide a nanosilica-containing thermoplastic hot-melt film, which has no problem in terms of bonding strength, has a thinner thickness, and can exhibit the same bonding strength as that of conventional products.

Another object of the present invention is to provide a nanosilica-containing thermoplastic hot-melt film, which has a thinner thickness than that of conventional thermoplastic hot-melt films (0.2 mm or more) and can exhibit a uniform adhesive property.

A thermoplastic hot-melt film having excellent bonding strength according to the present invention comprises: any one composition selected from among thermoplastic resin compositions, preferably thermoplastic polyurethane, ethylene vinyl acetate, polyamide and polyester compositions; and nanosilica, wherein the content of the nanosilica in the composition is 0.1 to 5.0 phr.

DETAILED DESCRIPTION OF THE INVENTION

Figure 1:
FIG. 1 is a photograph showing an engineered mesh used to test the bonding strength of a nanosilica-containing TPU hot-melt film according to the present invention and the bonding strength of a conventional TPU hot-melt film.
Figure 2:
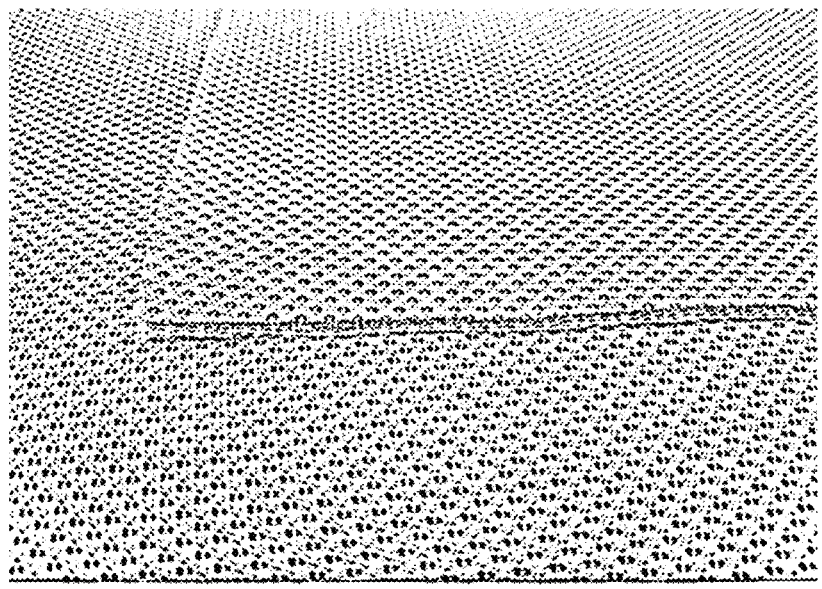
FIG. 2 is a photograph showing a sandwich mesh used to test the bonding strength of a nanosilica-containing TPU hot-melt film according to the present invention and the bonding strength of a conventional TPU hot-melt film.
Figure 3:
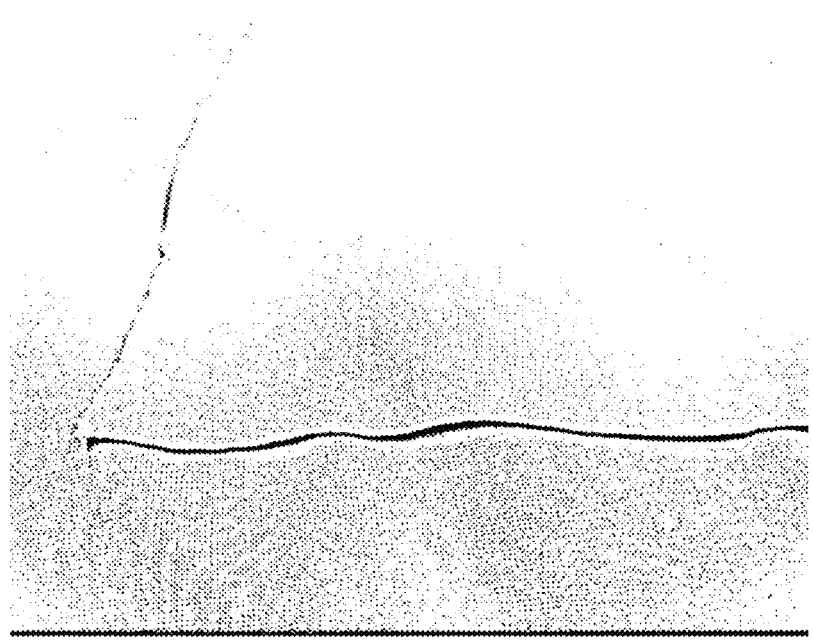
FIG. 3 is a photograph showing a lining fabric used to test the bonding strength of a nanosilica-containing TPU hot-melt film according to the present invention and the bonding strength of a conventional TPU hot-melt film.

Hereinafter, preferred embodiments of the present invention will be described with reference to the accompanying drawings and photographs. In the detailed description to be described below, exemplary embodiments of the present invention for achieving the above-described technical objects will be described. In addition, other embodiments of the present invention will be replaced by the description of the constitution of the present invention.

The present invention is intended to provide a nanosilica-containing thermoplastic hot-melt film having excellent bonding strength, which may be inserted between fabric and fabric to adhere them to each other and may be distributed uniformly on the surfaces of both the fabrics without excessively penetrating into one of the fabrics after melting by heat and pressure during no-sew press even if the yarn density of the fabrics is high or low or even if the hole diameter of the fabrics is large or small, thereby maximizing the adhesion between the fabrics. As used herein, the expression "distributed uniformly on the surface of the fabrics" means a uniform state in which ⅓ of the thermoplastic hot-melt film is distributed in the upper fabric, ⅓ in the lower fabric, and ⅓ between the fabrics (adhesive interface), without flowing of the thermoplastic hot-melt film toward the fabric having a relatively low yarn density or a relatively large hole diameter after melting during no-sew pressing. This can be clearly confirmed through the photographs shown below.

The thermoplastic hot-melt film of the present invention is characterized in that it can be distributed uniformly on the surfaces of fabrics to improve the adhesion therebetween, has no problem in terms of bonding strength, and can exhibit the same bonding strength as that of a conventional thermoplastic hot-melt film even when it is manufactured to have a thickness thinner than the thickness of the conventional thermoplastic hot-melt film (that is, 0.2 mm or more).

In particular, in the present invention, a nanosilica-containing thermoplastic hot-melt film having improved bonding strength is manufactured. Specifically, the content of the nanosilica is preferably about 0.1 to 5.0 phr, and the primary particle size of the nanosilica is 100 nm or less. An exemplary method for manufacturing the nanosilica-containing thermoplastic hot-melt film is as follows. When TPU resin is used, a resin for the nanosilica-containing thermoplastic hot-melt film is prepared by mixing nanosilica with a raw material, followed by polymerization, or is prepared by preparing a master batch using nanosilica and adding the master batch to TPU resin. In addition, when EVA, polyamide or polyester resin is used, a resin for the nanosilica-containing thermoplastic hot-melt film is prepared preparing a master batch using nanosilica and adding the master batch to each resin. This method will be described in detail below.

In the present invention, in order for a thermoplastic hot-melt film to exhibit excellent bonding strength at a thin thickness (0.2 mm or less), and particularly, in order to overcome the problem of a conventional thermoplastic hot-melt film, that is, in order to prevent the hot-melt film from flowing into a fabric having a relatively low yarn density or a relatively large hole diameter after melting during no-sew pressing, nanosilica is added during the manufacture of the thermoplastic hot-melt film. When nanosilica is added during the manufacture of the thermoplastic hot-melt film as described above, the uniformly dispersed nanosilica can prevent an excessive amount of the hot-melt film from flowing into any one of fabrics, and as a result, the hot-melt film can remain at the adhesive interface, thereby improving the adhesion between the fabrics.

Nanosilica was added during the manufacture of the thermoplastic hot-melt film as described above, and as a result, it could be seen that the bonding strength was improved even when nanosilica was added only in a small amount of 0.1 phr or more, and the hot-melt film showed the best bonding strength when nanosilica was added in an amount of about 0.5 to 1.0 phr. In addition, when the content of the nanosilica was 5.0 phr or more, it was shown that the surface of the thermoplastic hot-melt film became opaque, the bonding strength decreased rather than increased, and blooming on the surface of the hot-melt film occurred with the passage of time. In the present invention, experimental data comprising micrographs and SEM photographs will be presented in order to demonstrate the above-described effects and characteristics, and description will be made in detail with reference to FIGS. 1 to 18.

Meanwhile, the thermoplastic polyurethane that is used in the present invention is a virgin TPU. The virgin TPU is prepared by polymerizing polyester polyol, polyether polyol, polycarprolactone or the like with aromatic isocyanate or aliphatic isocyanate using a short-chain glycol (e.g., 1,4-butanediol) as a chain extender.

Furthermore, in the manufacture of the thermoplastic hot-melt film according to the present invention, in addition to the virgin TPU, various kinds of scraps, such as scrap remaining after high-frequency processing of TPU used for footwear applications or scrap remaining after processing of hot-melt TPU, may be used alone or in combination with the virgin TPU. In addition, the TPU, EVA resin, polyamide resin, polyester resin or like may be used in the manufacture of the thermoplastic hot-melt film.

The present invention specifically discloses a method for manufacturing a TPU hot-melt film, which is most widely used as a thermoplastic hot-melt film for footwear applications, among a TPU hot-melt film, an EVA hot-melt film, a polyamide hot-melt film, a polyamide hot-melt film, and a polyester hot-melt film, and particularly, discloses a method for a TPU hot-melt film containing nanosilica. Namely, detailed description will be made of a method of manufacturing a TPU hot-melt film by polymerization after adding nanosilica to raw materials (isocyanate, polyol, and glycol) which are used for TPU production as described above, and a method of manufacturing a TPU hot-melt film by making a master batch using nanosilica and adding the master batch to TPU resin in a predetermined amount.

First, a method for manufacturing the TPU hot-melt film according to the present invention will be described in detail. The method for manufacturing the TPU hot-melt film is performed by mixing and polymerizing raw materials which are used for TPU pellet production, and comprises four steps.

Namely, conventional raw materials for TPU pellet production are prepared. Specifically, polyol, isocyanate and short-chain glycol are prepared (hereinafter referred to as "step 1").

Nanosilica is added to any one selected from among the raw materials described above with respect to step 1 or is added to the raw materials, and the resulting mixture is kneaded (hereinafter referred to as "step 2"). This step is preferably performed at a temperature of 80 to 100° C. and a stirring speed of 20 to 30 rpm. The raw material sufficiently kneaded with nanosilica in step 2 and the remaining raw materials are simultaneously introduced into a reactive extruder, or the raw materials sufficiently with nanosilica are introduced simultaneously introduced into a reactive extruder, thereby producing TPU pellets (hereinafter referred as "step 3").

The TPU pellets produced in step 3 are dried and aged, thereby producing a resin for a TPU hot-melt film, and then the resin is introduced into a conventional T-die extruder, thereby manufacturing a TPU hot-melt film according to the present invention (hereinafter referred to as "step 4"). Namely, when a resin for a nanosilica-containing TPU hot-melt film is extruded in a film shape from a conventional T-die extruder or is coated on a conventional release paper, the nanosilica-containing TPU hot-melt film according to the present invention is obtained.

Next, a method of manufacturing a TPU hot-melt film according to the present invention by making a master batch using nanosilica and adding the master batch to TPU resin in a predetermined amount will be described in detail.

Namely, the above-described TPU (e.g., virgin TPU, TPU scrap, or a mixture thereof), EVA, polyamide or polyester resin and nanosilica are weighed in predetermined amounts. At this time, the content of the nanosilica preferably does not exceed 40%.

Then, the nanosilica and the TPU (or EVA, polyamide or polyester resin) are introduced into a conventional kneader and kneaded at a temperature of 100 to 120° C. and a stirring speed of 20 to 30 rpm.

Next, the TPU (or EVA, polyamide or polyester resin) kneaded with the nanosilica is cooled, crushed to a diameter of less than 10 mm, and then introduced into a conventional twin-screw extruder. At this time, the temperature of the twin-screw extruder is 150 to 200° C.

Thereafter, the resin compounded in the twin-screw extruder is pelletized while it is passed through cooling water at 15 to 20° C., thereby preparing the master batch defined in the present invention. The master batch is added to TPU in a predetermined amount, thereby preparing a resin for a TPU hot-melt film.

Next, the resin is introduced into a conventional T-die extruder, thereby manufacturing a TPU hot-melt film according to the present invention. Namely, when a resin for a TPU hot-melt film, prepared by mixing the nanosilica-containing master batch with TPU, is extruded in a film shape from a conventional T-die extruder or is coated on a conventional release paper, the nanosilica-containing TPU hot-melt film according to the present invention is obtained.

Hereinafter, experimental date (preferably bonding strength test results) will be described in detail with reference to FIGS. 1 to 18 in order to demonstrate the effect of the nanosilica-containing TPU hot-melt film as described above.

Figure 4:
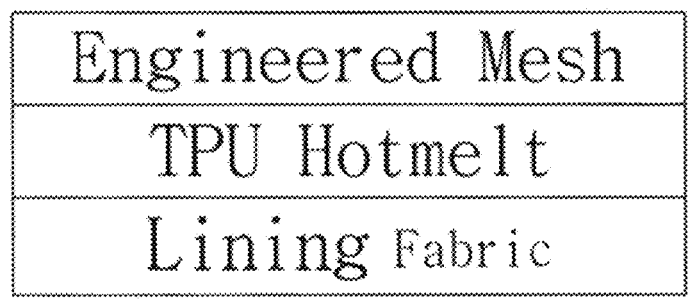
FIG. 4 shows a state in which a TPU hot-melt film according to the present invention is adhered between an engineered mesh corresponding to an upper and a lining fabric corresponding to a lining in order to test the bonding strength of a nanosilica-containing TPU hot-melt film according to the present invention and the bonding strength of a conventional TPU hot-melt film.
Figure 5:
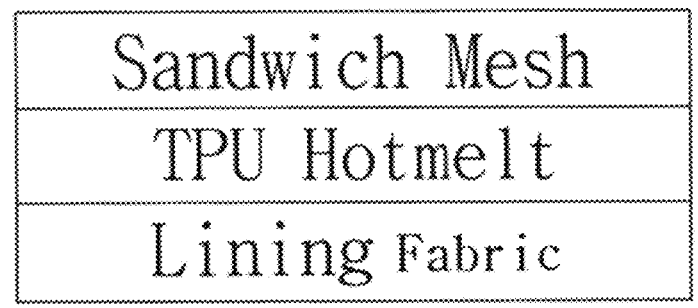
FIG. 5 shows a state in which a TPU hot-melt film according to the present invention is adhered between a sandwich mesh corresponding to an upper and a lining fabric corresponding to a lining in order to test the bonding strength of a nanosilica-containing TPU hot-melt film according to the present invention and the bonding strength of a conventional TPU hot-melt film.
Figure 6:
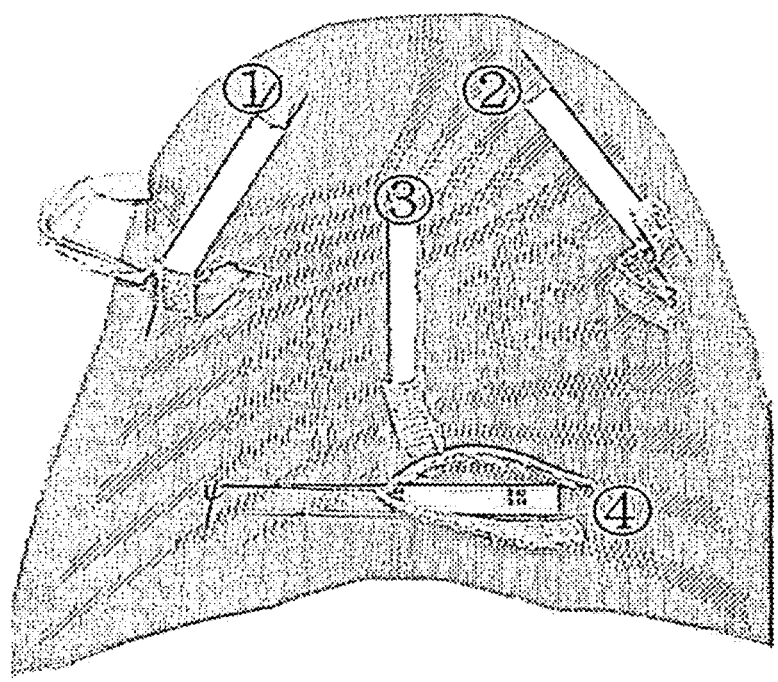
FIG. 6 is a photograph showing a state in which portions ①, ②, ③ and ④ have been detached in order to examine the adhesion of the TPU hot-melt film between the engineered mesh and the lining fabric as shown in FIG. 4.
Figure 7:
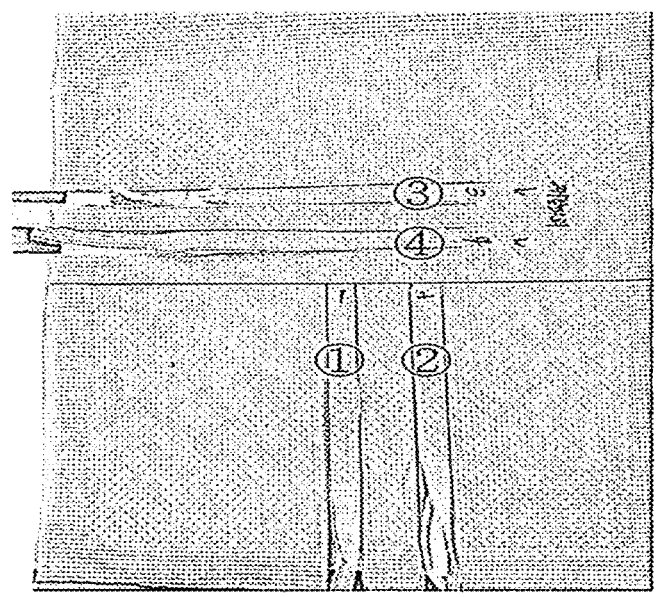
FIG. 7 is a photograph showing a state in which portions ①, ②, ③ and ④ have been detached in order to examine the adhesion of the TPU hot-melt film between the sandwich mesh and the lining fabric as shown in FIG. 5.

FIGS. 1 to 7 show preparation steps for bonding strength tests. As fabrics to be adhered, general-purpose fabrics which are used for footwear were used. Specifically, the engineered mesh and sandwich mesh shown in FIGS. 1 and 2, which are used mainly as upper materials, and the lining fabric shown in FIG. 3, which is used mainly as a lining material, were used. In addition, regarding the adhered structures and pressing conditions, as shown in FIGS. 4 and 5, a TPU hot-melt film was inserted between the engineered mesh or sandwich mesh corresponding to an upper and the lining fabric corresponding to a lining, and then pressing was performed under a pressure of 60 kgf at 130° C. for 30 seconds. As the TPU hot-melt film, each of a conventional TPU hot-melt films and TPU hot-melt films having different nanosilica contents according to the present invention was used. In addition, as shown in FIGS. 6 and 7, portions ①, ②, ③ and ④ of the fabrics adhered to each other by the TPU hot-melt film were detached and the adhesion state was examined. The results are shown in Table 1 below. In Table 1 below, portions omitting values in the "engineered mesh (kgf/cm)" and "sandwich mesh adhesion (kgf/cm)" columns, that is, portions ④ indicated in bold, mean that the material was broken due to good bonding strength.

Here, the thickness of TPU hot-melt films, which are most generally used in the footwear manufacturing industry, is 0.2 mm.

On the contrary, each of the TPU hot-melt films having various nanosilica contents (i.e., 1 phr, 2 phr and 3 phr) according to the present invention was used to adhere each of the engineered mesh and the sandwich mesh (which are upper materials) to the lining fabric which is a lining material, and the TPU hot-melt films were tested at various thicknesses. As a result, it was shown that the hot-melt films having nanosilica contents of 1 phr and 2 phr, respectively, showed good bonding strength even at a thin thickness of 0.1 mm, and also showed stable bonding strength at thicknesses of 0.15 mm and 0.2 mm.

Meanwhile, when the nanosilica content was 3 phr, it was shown that the bonding strength was somewhat decreased due to the increase in the nanosilica content. When the nanosilica content was increased to 5 phr, the bonding strength slightly decreased, but there was no problem in terms of the adhesion between the fabrics. However, when the nanosilica content was more than 5 phr, it did interfere with the adhesion, and also reduced the transparency of the TPU hot-melt film and caused a blooming problem.

As described above, in the present invention, the adhesion test results suggest that the bonding strength of the nanosilica-containing TPU hot-melt film was increased. In order

TABLE 1

| No. | Film name | Thickness (mm) | Nanosilica content (phr) | Engineered mesh adhesion (kgf/cm) | Sandwich mesh adhesion (kgf/cm) | Tfb (° C.) | MI (g/10 min) |
|---|---|---|---|---|---|---|---|
| 1 | Conventional TPU hot- | 0.10 | 0 | ①–1.51/②–1.64/ ③–2.13/④–2.19 | ①–2.00/②–1.27/ ③–1.37/④–2.13 | 121.0 | 9.13 |
| 2 | melt films | 0.15 | 0 | ①–1.99/②–2.59/ ③–2.20/④–2.63 | ①–2.40/②–1.96/ ③–2.49/④–2.62 | | |
| 3 | | 0.20 | 0 | ①–2.82/②–3.40/ ③–2.85/④–3.01 | ①–2.25/②–3.12/ ③–2.41/④–3.52 | | |
| 4 | TPU hot-melt films of | 0.10 | 1.0 | ①–3.17/②–3.23/ ③–3.14/④— | ①–2.79/②–2.52/ ③–2.58/④–2.83 | 120.6 | 11.10 |
| 5 | the present invention | 0.15 | 1.0 | ①–3.83/②–3.48/ ③–4.23/④–3.83 | ①–3.35/②–3.16/ ③–3.29/④–3.47 | | |
| 6 | | 0.20 | 1.0 | ①–4.00/②–3.86/ ③–5.16/④— | ①–3.67/②–4.20/ ③–4.52/④— | | |
| 7 | | 0.10 | 2.0 | ①–3.28/②–3.34/ ③–3.62/④— | ①–2.88/②–3.13/ ③–3.22/④–3.27 | 124.4 | 9.76 |
| 8 | | 0.15 | 2.0 | ①–4.41/②–3.72/ ③–4.45/④— | ①–3.93/②–3.81/ ③–3.34/④–3.04 | | |
| 9 | | 0.20 | 2.0 | ①–4.17/②–4.56/ ③–5.00/④— | ①–4.43/②–4.42/ ③–3.51/④–4.33 | | |
| 10 | | 0.10 | 3.0 | ①–3.67/②–2.95/ ③–3.64/④–3.06 | ①–2.31/②–2.86/ ③–2.66/④–2.70 | 125.9 | 10.29 |
| 11 | | 0.15 | 3.0 | ①–3.84/②–3.94/ ③–3.95/④–3.41 | ①–2.41/②–3.30/ ③–2.68/④–3.15 | | |
| 12 | | 0.20 | 3.0 | ①–5.13/②–4.13/ ③–4.90/④— | ①–4.09/②–4.60/ ③–4.32/④–3.66 | | |
| 13 | | 0.10 | 5.0 | ①–2.42/②–2.25/ ③–3.24/④–2.06 | ①–2.31/②–2.16/ ③–2.06/④–1.70 | 130.5 | 7.35 |
| 14 | | 0.15 | 5.0 | ①–2.84/②–2.94/ ③–1.95/④–2.41 | ①–2.41/②–3.10/ ③–2.78/④–2.15 | | |
| 15 | | 0.20 | 5.0 | ①–3.13/②–3.13/ ③–2.90/④–3.35 | ①–3.09/②–2.60/ ③–2.32/④–2.66 | | |

As shown in Table 1 above, when each of the engineered mesh and the sandwich mesh, which are generally used as an upper material for footwear, was adhered to the lining fabric which is a lining material, the conventional TPU hot-melt films showed a suitable bonding strength (Min 2.5 kgf/cm) even when the thickness thereof was 0.2 mm or more. However, when the thickness of the TPU hot-melt film was less than 0.2 mm (that is, a thickness of 0.10 mm or 0.15 mm), the bonding strength was below the reference value.

to clearly confirm the test results, the adhesive section of the TPU hot-melt film adhered between the fabrics was observed by micrography after no-sew pressing, and the results are as follows.

Figure 8:
FIG. 8 is a 100× electron micrograph of the section of the engineered mesh shown in FIG. 1.
Figure 9:
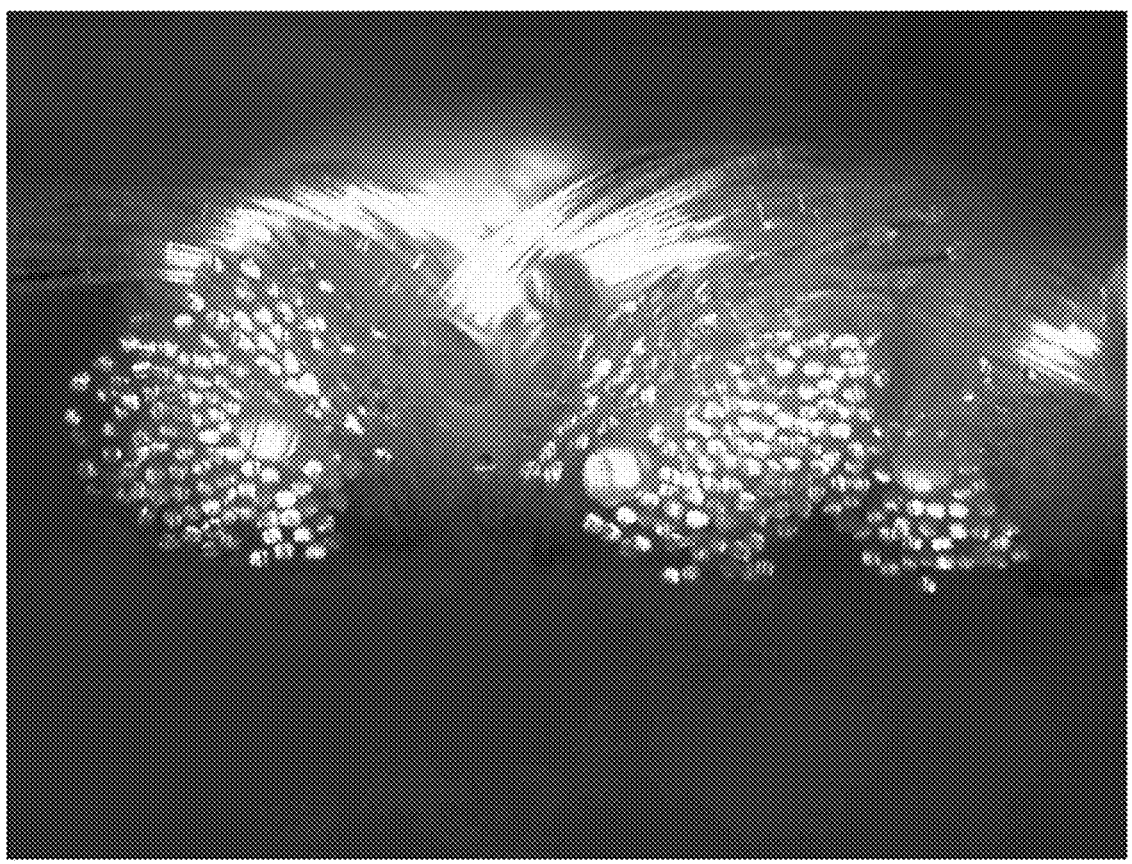
FIG. 9 is a 100× electron micrograph of the section of the sandwich mesh shown in FIG. 2.
Figure 10:
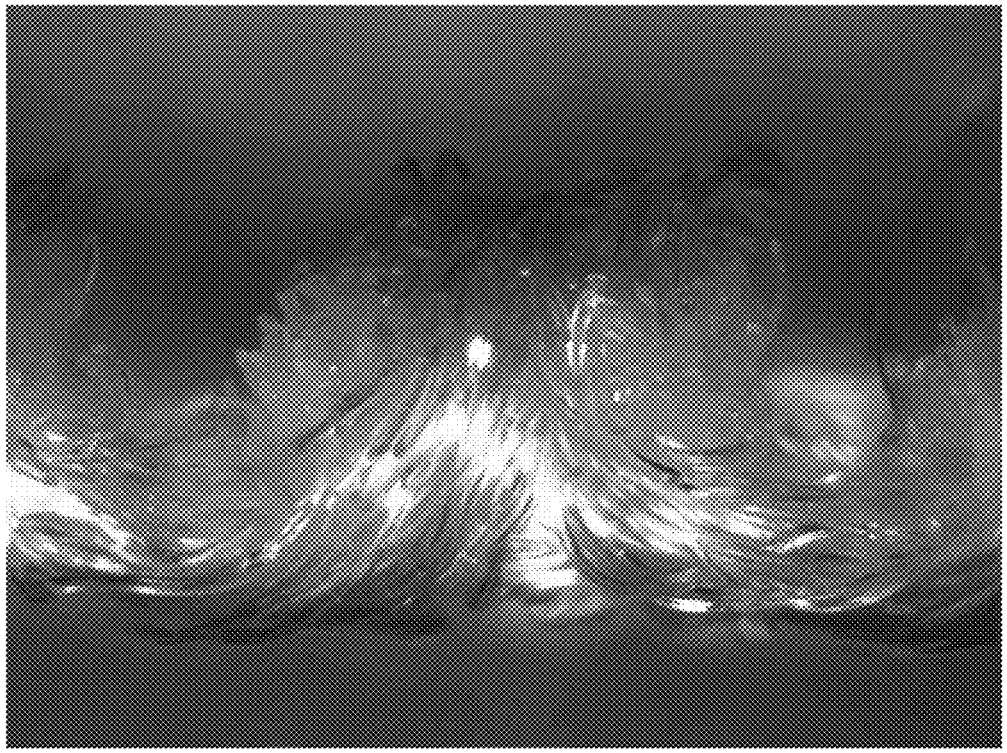
FIG. 10 is a 100× electron micrograph of the section of the lining fabric shown in FIG. 3.
Figure 11:
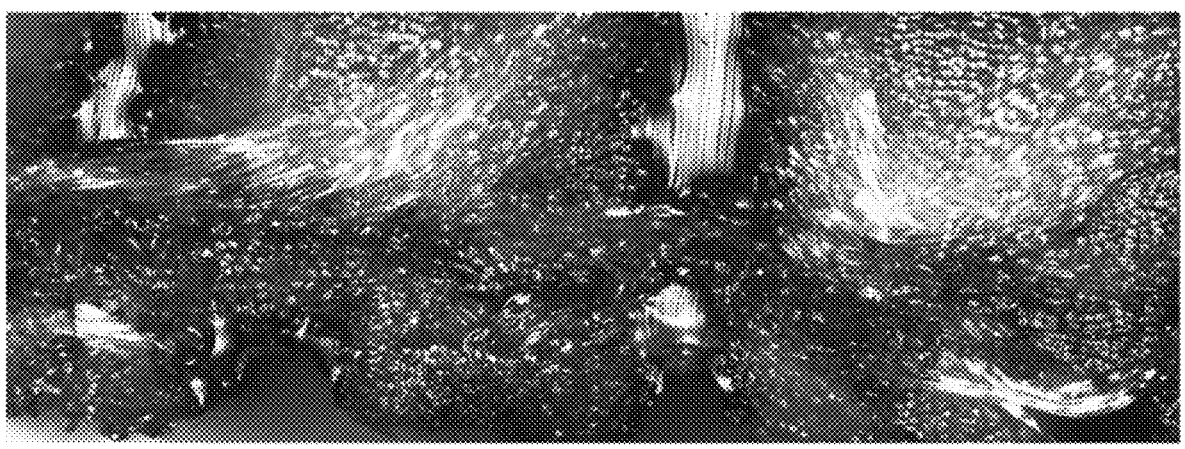
FIG. 11 is a 100× electron micrograph of the section of an engineered mesh and a lining fabric, which were adhered to each other using a conventional TPU hot-melt film.
Figure 12:
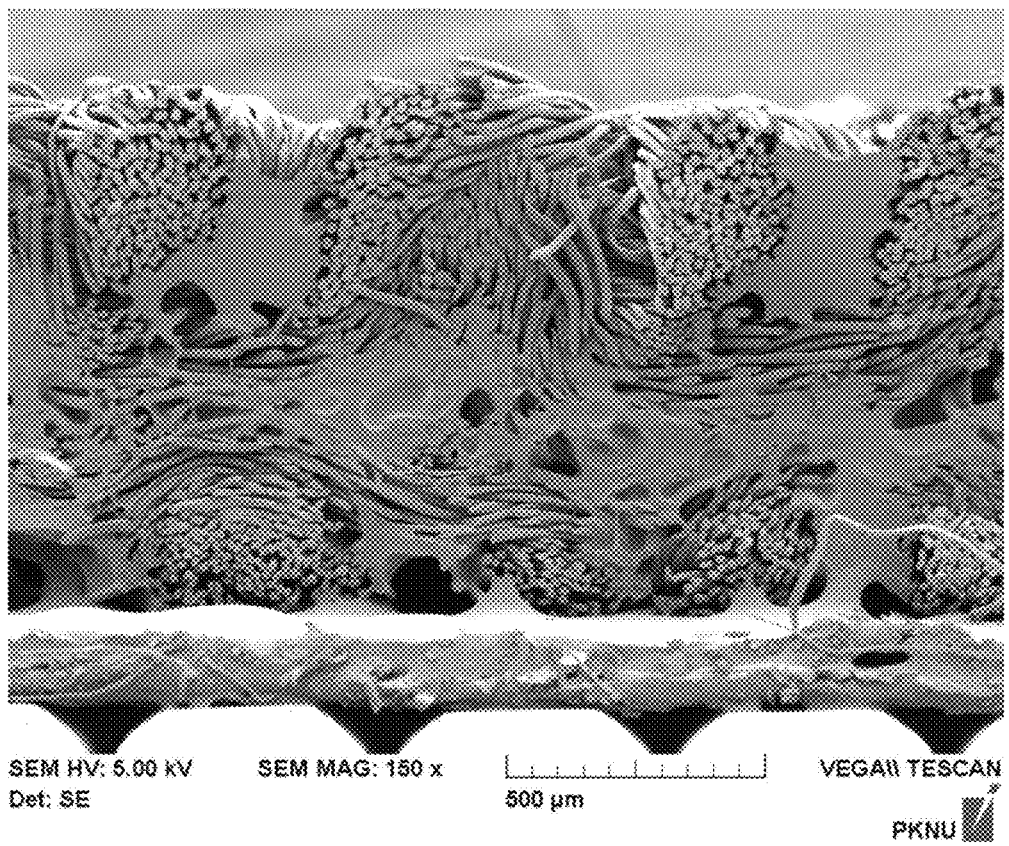
FIG. 12 is a 150× SEM micrograph of the section of an engineered mesh and a lining fabric, which were adhered to each other using a conventional TPU hot-melt film.
Figure 13:
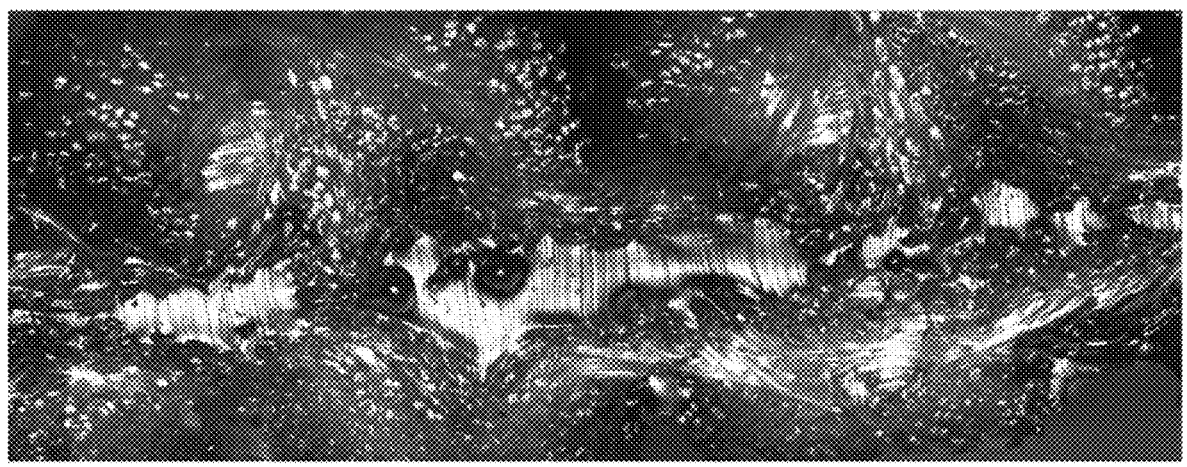
FIG. 13 is a 100× electron micrograph of the section of an engineered mesh and a lining fabric, which were adhered to each other using a nanosilica-containing TPU hot-melt film according to the present invention.
Figure 14:
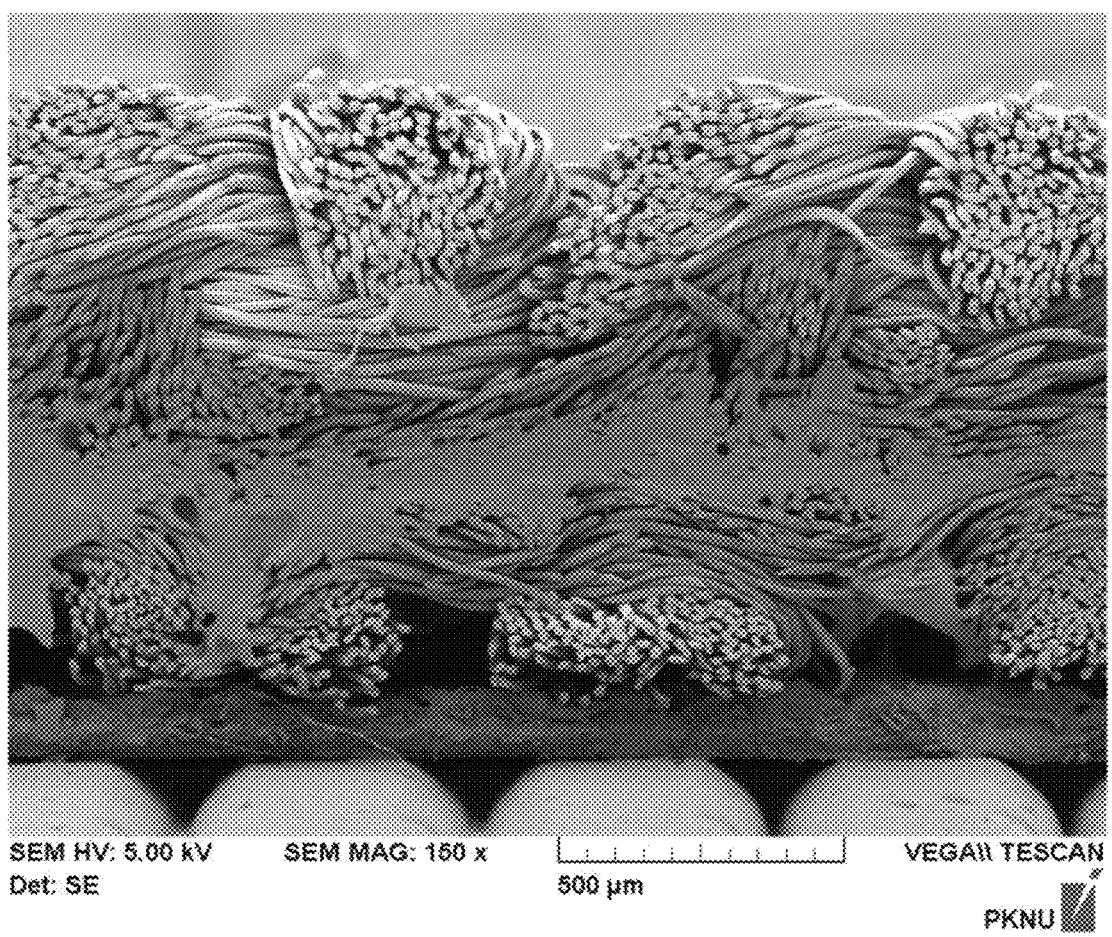
FIG. 14 is a 150× SEM micrograph of the section of an engineered mesh and a lining fabric, which were adhered to each other using a nanosilica-containing TPU hot-melt film according to the present invention.
Figure 15:
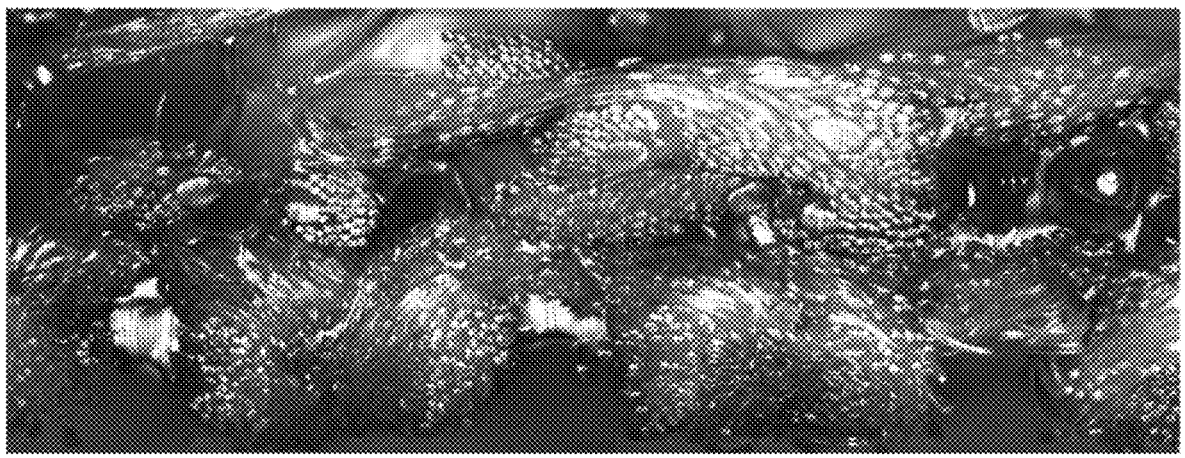
FIG. 15 is a 100× electron micrograph of the section of a sandwich mesh and a lining fabric, which were adhered to each other using a conventional TPU hot-melt film.
Figure 16:
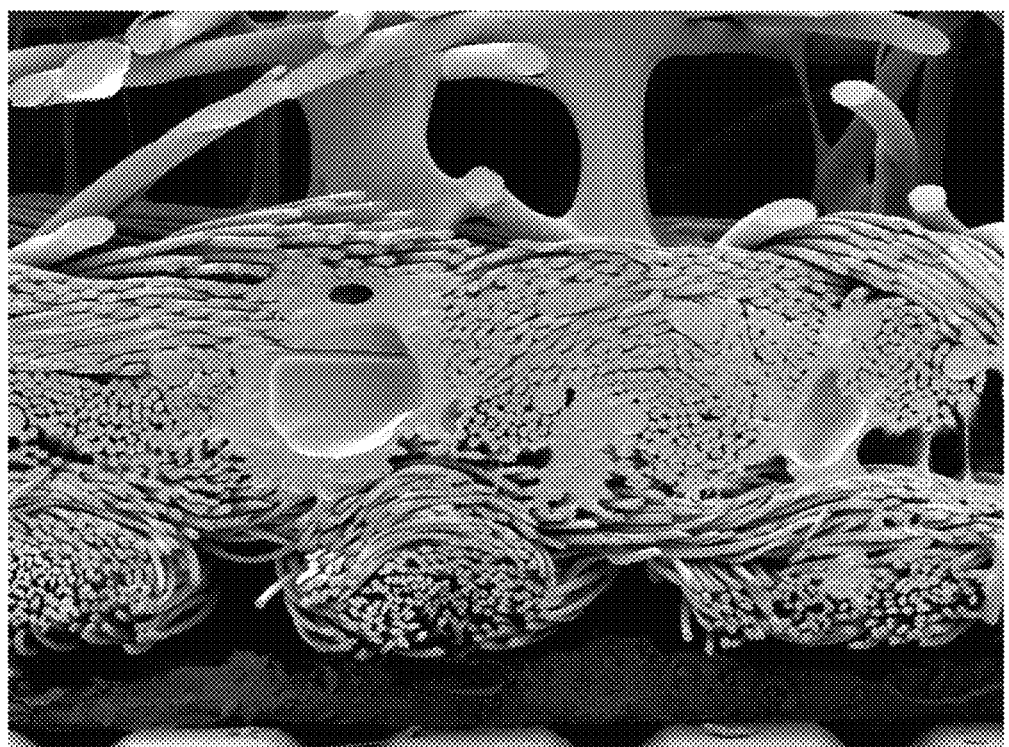
FIG. 16 is a 150× SEM micrograph of the section of a sandwich mesh and a lining fabric, which were adhered to each other using a conventional TPU hot-melt film.
Figure 17:
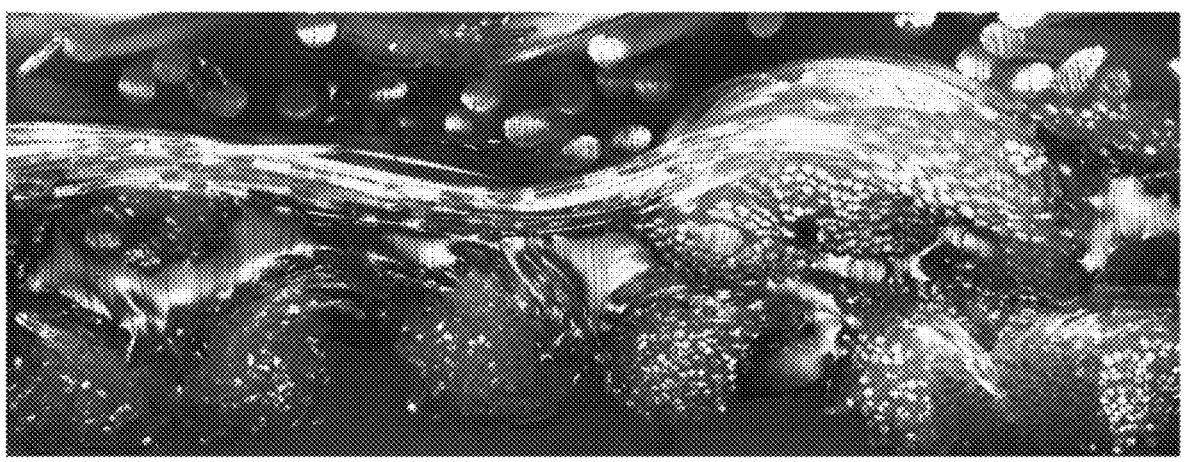
FIG. 17 is a 100× electron micrograph of the section of a sandwich mesh and a lining fabric, which were adhered to each other using a nanosilica-containing TPU hot-melt film according to the present invention.
Figure 18:
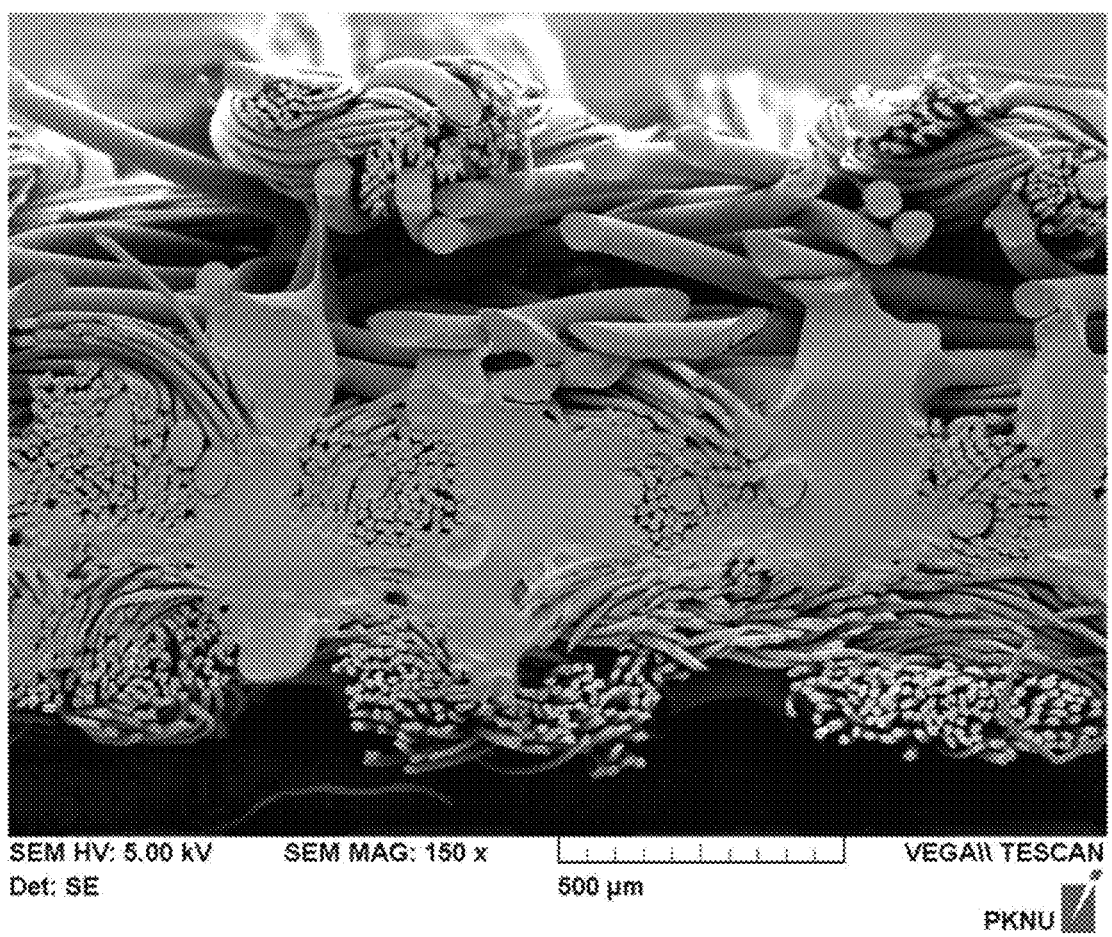
FIG. 18 is a 150× SEM micrograph of the section of a sandwich mesh and a lining fabric, which were adhered to each other using a nanosilica-containing TPU hot-melt film according to the present invention.

FIG. 8 is a 100× electron micrograph of the section of the engineered mesh shown in FIG. 1; FIG. 9 is a 100× electron micrograph of the section of the sandwich mesh shown in FIG. 2; and FIG. 10 is a 100× electron micrograph of the section of the lining fabric shown in FIG. 3.

In addition, FIGS. 11 to 18 to be described in detail below are electron micrographs and SEM photographs of portions (i.e., portion ③ of FIG. 6 and portion ② of FIG. 7) subjected to an adhesion test in order to examine adhesion results after adhering each of different types of upper fabrics (i.e., engineered mesh and sandwich mesh) to the lining fabric by each of TPU hot-melt films (i.e., a conventional TPU hot-melt film and a nanosilica-containing TPU hot-melt film of the present invention). Additionally, FIGS. 19-20 show electron micrographs and SEM photographs of the adhesive sections obtained when the conventional TPU hot-melt film was used and when the nanosilica-containing TPU hot-melt film of the present invention was used.

Figure 19:
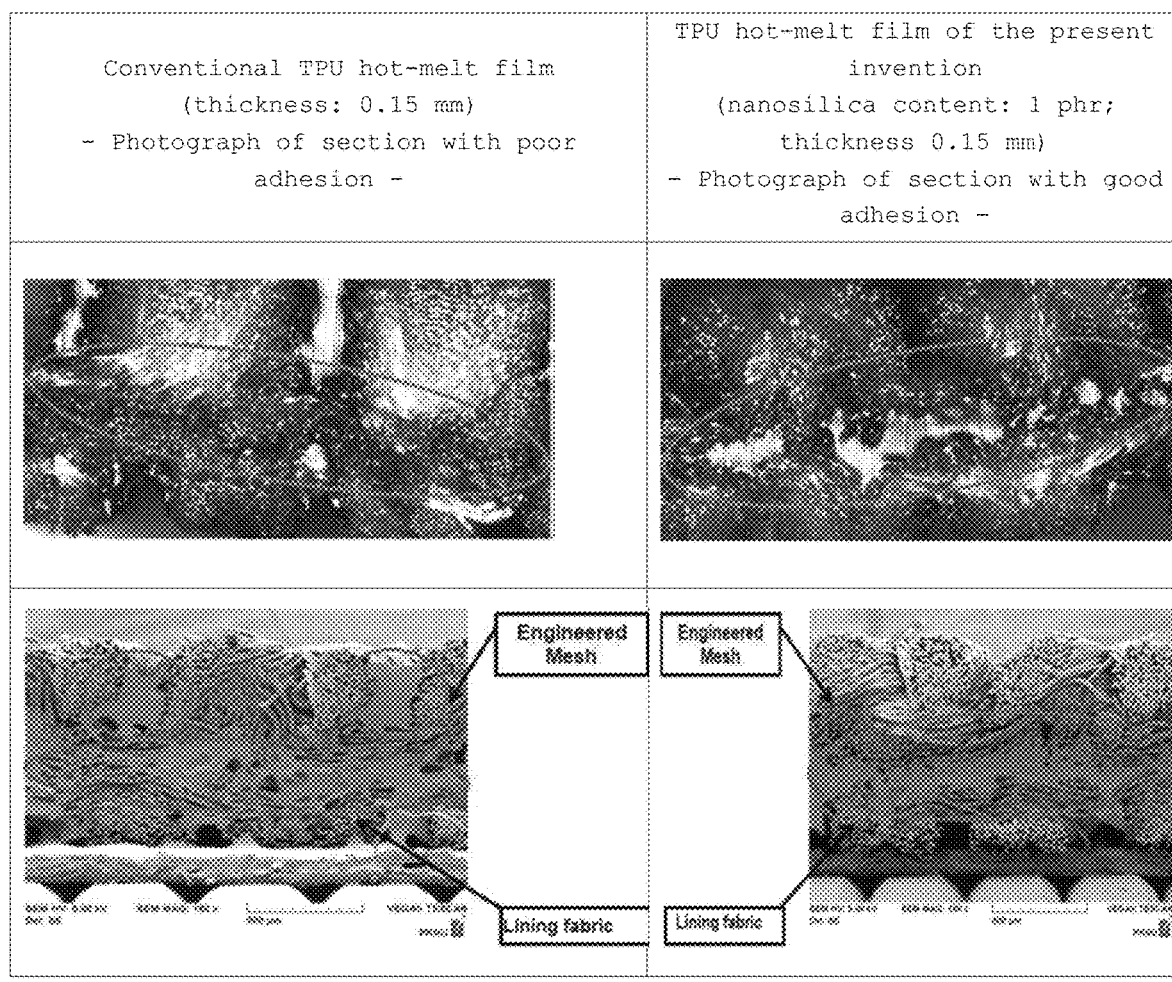
FIG. 19 shows electron micrographs of the adhesive sections obtained when the conventional TPU hot-melt film was used and when the nanosilica-containing TPU hot-melt film of the present invention was used.
Figure 20:
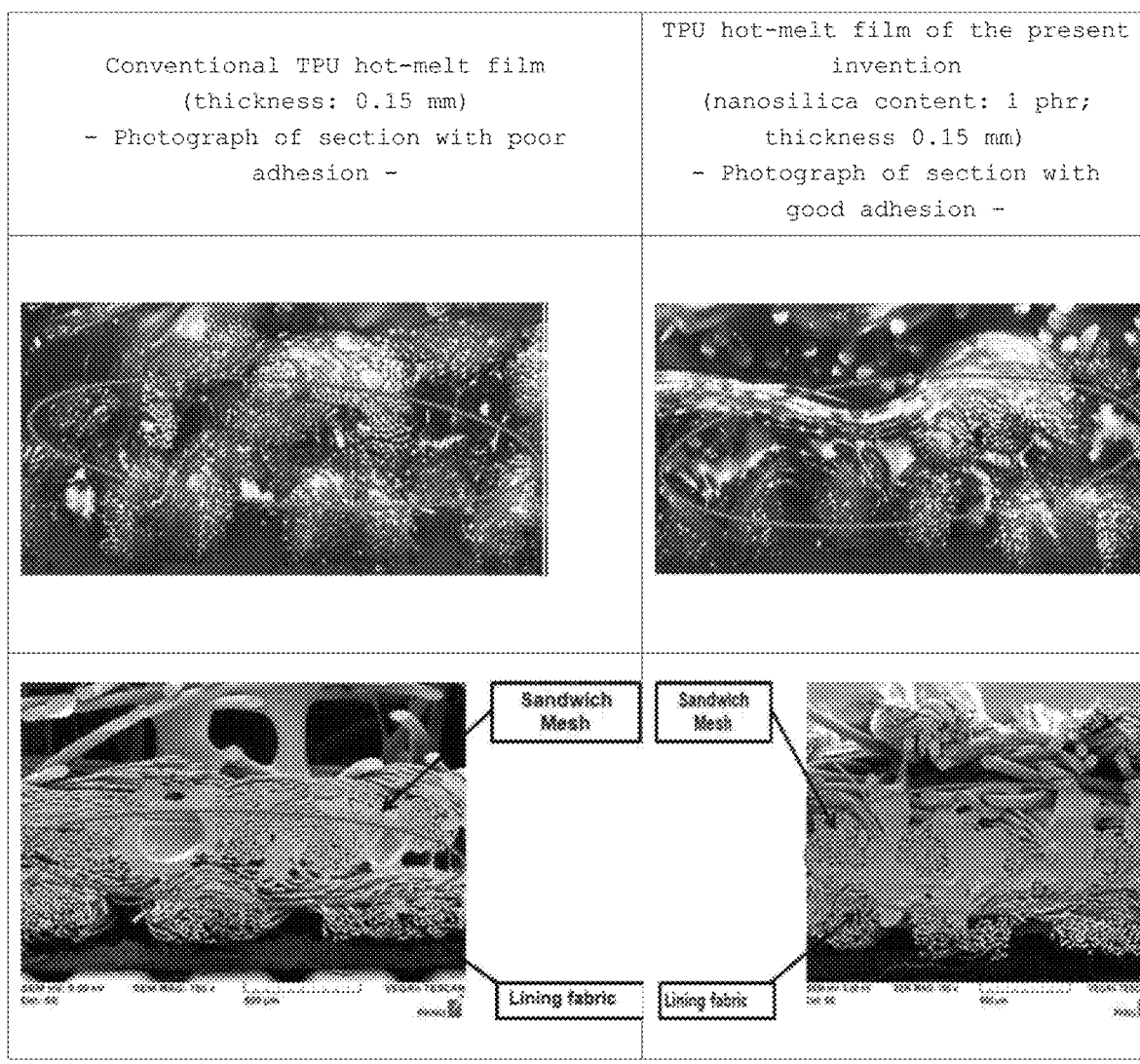
FIG. 20 show SEM photographs of the adhesive sections obtained when the conventional TPU hot-melt film was used and when the nanosilica-containing TPU hot-melt film of the present invention was used.

FIGS. 19-20 are electron micrographs and SEM photographs in which the red oval portions show the adhesive interface between the fabrics. As can be seen in the SEM photographs, in the fabrics with poor adhesion, the amount of TPU hot-melt film, which remained at the adhesive interface and adhered between the two fabrics, was relatively very small, and the majority of the TPU hot-melt film penetrated into one fabric (upper fabric) having relatively large holes after melting, suggesting that the amount of TPU hot-melt film remaining at the adhesive interface was small (see each of FIGS. 11, 12, 15 and 16).

On the contrary, in the case of the fabrics (i.e., fabrics with good adhesion) adhered by the nanosilica-containing TPU hot-melt film according to the present invention, the TPU hot-melt film remained at the adhesive interface without being biased to any one fabric and it was adhered between the two fabrics, suggesting that it had good bonding strength.

In addition, the conventional TPU hot-melt film was sensitive to heat and pressure during no-sew pressing, and thus the flowability thereof increased rapidly. For this reason, it excessively penetrated one fabric without remaining at the adhesive interface between the fabrics, and thus showed poor bonding strength. To overcome this problem, according to the present invention, nanosilica was added to the TPU hot-melt film. In this case, it could be seen that a specific amount of the TPU hot-melt film remained at the adhesive interface, and thus showed improved bonding strength even when the thickness thereof was thin.

When nanosilica is used as a copolymer with TPU as described above, the chemical bonding and Van der Waals bonding in the urethane resin can increase, and the rheology and coadhesion of the TPU can increase, leading to an increase in the bonding strength. This can eventually increase the structural adhesion.

When nanosilica is used in the TPU hot-melt film as described above, the TPU hot-melt film can exhibit the same adhesive performance even at a thinner thickness compared to a conventional TPU hot-melt film. Thus, in this case, there are advantages in that the cost for the resin for the TPU hot-melt film can be reduced and in that the softness of the fabrics that were adhered to each other increases and footwear comprising the adhered fabrics becomes lighter in weight.

Meanwhile, Table 2 below show the results of second adhesion tests (no-sew pressing) for TPU hot-melt films having nanosilica contents adjusted in detail, and the adhesion test conditions are the same as described with respect to Table 1 above. In Table [ ]2 below, portions omitting values in the "engineered mesh (kgf/cm)" and "sandwich mesh adhesion (kgf/cm)" columns, that is, portions ① and ② indicated in bold, mean that the material was broken due to good bonding strength.

TABLE 2

| No. | Film name | Thickness (mm) | Nanosilica content (phr) | Engineered mesh adhesion (kgf/cm) | Sandwich mesh adhesion (kgf/cm) | Tfb (°C.) | MI (g/10 min) |
|---|---|---|---|---|---|---|---|
| 1 | Conventional IPU hot-melt film | 0.10 | | ①-0.88/②-1.05/③-2.19/④-1.80 | ①-1.13/②-1.39/③-2.04/④-2.14 | 121.0 | 9.13 |
| 2 | | 0.15 | | ①-1.36②-1.56/③-2.62/④-2.35 | ①-1.35/②-1.60/③-2.60/④-2.43 | | |
| 3 | | 0.20 | | ①-2.59/②-2.64/③-2.88/④-3.20 | ①-2.20/②-3.52/③-3.17/④-3.45 | | |
| 4 | TPU hot-melt films of the present invention | 0.10 | 0.1 | ①-1.32/②-1.75/③-2.28/④-2.17 | ①-2.00/②-2.14/③-1.83/④-1.96 | 121.2 | 9.27 |
| 5 | | 0.15 | 0.1 | ①-2.27/②-2.10/③-2.49/④-2.56 | ①-2.28②-2.63/③-2.69/④-2.30 | | |
| 6 | | 0.20 | 0.1 | ①-2.67/②-3.25/③-3.48/④-3.60 | ①-3.37/②-3.27/③-3.08/④-3.14 | | |
| 7 | | 0.10 | 0.3 | ①-2.02/②-1.95/③-2.61/④-2.57 | ①-2.30/②-2.44/③-2.83/④-2.96 | 121.7 | 9.84 |
| 8 | | 0.15 | 0.3 | ①-2.17/②-2.60/③-2.59/④-2.76 | ①-2.98/②-2.68/③-2.29/④-2.80 | | |
| 9 | | 0.20 | 0.3 | ①-2.61/②-3.55/③-3.43/④-3.10 | ①-3.27/②-—/③-3.08/④-3.54 | | |
| 10 | | 0.10 | 0.5 | ①-2.73/②-2.89/③-2.94/④-2.84 | ①-2.84/②-2.56/③-2.88/④-2.82 | 119.6 | 12.63 |
| 11 | | 0.15 | 0.5 | ①-2.95/②-3.16/③-3.60/④-3.43 | ①-3.15/②-3.52/③-3.06/④-3.45 | | |
| 12 | | 0.20 | 0.5 | ①-3.20/②-3.52/③-4.17/④-3.45 | ①-3.45/②-—/③-3.43/④-3.31 | | |
| 13 | | 0.10 | 0.7 | ①-2.71/②-2.62/③-2.86/④-2.91 | ①-—/②-—/③-2.90/④-2.93 | | |
| 14 | | 0.15 | 0.7 | ①-3.33/②-3.39/③-3.75/④-3.08 | ①-—/②-—/③-3.51/④-3.97 | 125.9 | 10.29 |
| 15 | | 0.20 | 0.7 | ①-4.20/②-3.47/③-4.71/④-3.10 | ①-—/②-—/③-3.62/④-4.92 | | |

TABLE 2-continued

| No. | Film name | Thickness (mm) | Nanosilica content (phr) | Engineered mesh adhesion (kgf/cm) | Sandwich mesh adhesion (kgf/cm) | Tfb (° C.) | MI (g/10 min) |
|---|---|---|---|---|---|---|---|
| 16 | | 0.10 | 1.0 | ①-3.27/②-3.23/③-3.04/④-2.87 | ①-2.59/②-2.58/③-2.78/④-2.97 | 124.8 | 10.11 |
| 17 | | 0.15 | 1.0 | ①-3.23/②-3.35/③-4.03/④-3.76 | ①-3.15/②-3.19/③-3.39/④-3.07 | | |
| 18 | | 0.20 | 1.0 | ①-4.20/②-3.96/③-5.38/④-4.88 | ①-3.45/②-4.10/③-4.22/④-3.88 | | |

Table 2 above show the results of the second adhesion tests performed according to the content of nanosilica and the type of fabric. As shown therein, like the results of the first adhesion tests shown in Table 1 above, when the conventional TPU hot-melt film was used to adhere each of engineered mesh and sandwich mesh (which are generally used as upper materials for footwear) to the lining fabric which is a lining material, it showed an appropriate bonding strength (Min 2.5 kgf/cm) only when the thickness of the TPU hot-melt film was 0.2 mm or more. However, when the thickness of the TPU hot-melt film was less than 0.2 mm (i.e., 0.10 mm or 0.15 mm), the bonding strength was below the reference value.

However, fabrics that were adhered to each other by each of TPU hot-melt films having different nanosilica contents (preferably, nanosilica contents of 1 phr or less) according to the present invention were subjected to the adhesion test at different thicknesses, and as a result, it was shown that when nanosilica was added in amounts of 0.1 phr and 0.3 phr, the bonding strength was improved compared to that of the conventional hot-melt film, even though the bonding strength was somewhat unstable at thin thicknesses of 0.1 mm and 0.15 mm. In addition, when the nanosilica content was 0.5 phr or more, the hot-melt film showed good bonding strength. Namely, when the nanosilica content was 1 phr, good bonding strength could be obtained as in the first adhesion test.

As described above, the results of the first and second adhesion tests indicated that the nanosilica content is preferably about 0.5 to 3 phr, which can give stable help to adhesion. However, it is considered that a nanosilica content of 0.1 to 5.0 phr may be used in the present invention. If the nanosilica content is more than 5 phr, a problem may arise in that the high nanosilica content reduces the bonding strength and transparency of the hot-melt film and causes blooming on the surface. Thus, in the present invention, it was confirmed through the tests that when the content of nanosilica used in the manufacture of the TPU hot-melt film was 0.1 to 5.0 phr, the best ideal object and effect could be achieved.

Table 3 below shows the results of adhesion tests performed using EVA hot-melt films, polyamide hot-melt films and polyester hot-melt films, which had different nanosilica contents, other than TPU hot-melt films.

TABLE 3

| No. | Film name | Thickness (mm) | Nanosilica content (phr) | Engineered mesh adhesion (kgf/cm) | Sandwich mesh adhesion (kgf/cm) | Tfb (° C.) | MI (g/10 min) |
|---|---|---|---|---|---|---|---|
| 1 | EVA hot-melt films | 0.20 | | ①-0.64/②-0.85/③-0.75/④-0.80 | ①-0.73/②-0.89/③-0.94/④-0.84 | 115.5 | 13.2 |
| 2 | | | 1.0 | ①-1.16/②-1.26/③-1.22/④-1.35 | ①-1.21/②-1.40/③-1.20/④-1.43 | 116.8 | 12.5 |
| 3 | | | 2.0 | ①-1.59/②-1.64/③-1.88/④-1.70 | ①-1.50/②-1.52/③-1.57/④-1.45 | 117.5 | 10.5 |
| 4 | | | 3.0 | ①-2.32/②-1.85/③-2.18/④-2.15 | ①-2.10/②-2.13/③-1.83/④-1.93 | 119.2 | 9.3 |
| 5 | | | 4.0 | ①-2.17/②-2.10/③-1.87/④-2.06 | ①-2.18/②-2.33/③-2.29/④-2.10 | 121.2 | 8.8 |
| 6 | | | 5.0 | ①-1.37/②-1.25/③-1.48/④-1.60 | ①-1.37/②-1.23/③-1.58/④-1.24 | 123.4 | 7.2 |
| 7 | Polyamide hot-melt films | 0.20 | | ①-0.34/②-0.35/③-0.62/④-0.63 | ①-0.63/②-0.53/③-0.67/④-0.54 | 112.2 | 10.3 |
| 8 | | | 1.0 | ①-0.86/②-0.96/③-0.93/④-1.02 | ①-1.01/②-1.11/③-1.05/④-0.98 | 113.8 | 9.8 |
| 9 | | | 2.0 | ①-1.49/②-1.53/③-1.72/④-1.75 | ①-1.80/②-1.72/③-1.64/④-1.55 | 114.5 | 9.2 |
| 10 | | | 3.0 | ①-1.62/②-1.55/③-1.78/④-1.67 | ①-1.87/②-1.43/③-1.72/④-1.81 | 115.2 | 8.9 |
| 11 | | | 4.0 | ①-1.17/②-1.12/③-1.27/④-1.35 | ①-1.38/②-1.34/③-1.49/④-1.30 | 117.2 | 8.2 |
| 12 | | | 5.0 | ①-1.02/②-1.05/③-1.22/④-1.15 | ①-1.14/②-1.23/③-1.18/④-1.28 | 118.4 | 7.8 |
| 13 | Polyester hot-melt films | 0.20 | | ①-1.88/②-1.87/③-1.95/④-2.10 | ①-1.78/②-1.85/③-1.94/④-1.87 | 118.2 | 12.5 |
| 14 | | | 1.0 | ①-2.18/②-2.36/③-2.52/④-2.55 | ①-2.31/②-2.45/③-2.40/④-2.48 | 118.8 | 11.5 |

TABLE 3-continued

| No. | Film name | Thickness (mm) | Nanosilica content (phr) | Engineered mesh adhesion (kgf/cm) | Sandwich mesh adhesion (kgf/cm) | Tfb (° C.) | MI (g/10 min) |
|---|---|---|---|---|---|---|---|
| 15 | | | 2.0 | ①-2.59/②-2.84/③-2.78/④-2.70 | ①-2.80/②-2.82/③-3.01/④-2.95 | 119.5 | 10.2 |
| 16 | | | 3.0 | ①-2.35/②-2.75/③-2.68/④-2.55 | ①-2.55/②-2.75/③-2.81/④-2.43 | 120.5 | 9.7 |
| 17 | | | 4.0 | ①-2.07/②-2.15/③-2.22/④-2.05 | ①-2.13/②-2.23/③-2.09/④-2.15 | 121.8 | 8.5 |
| 18 | | | 5.0 | ①-1.87/②-1.98/③-1.88/④-1.76 | ①-1.90/②-2.03/③-1.88/④-1.94 | 122.4 | 7.8 |

As can be seen in Table 3 above, the EVA hot-melt films, the polyamide hot-melt films and the polyester hot-melt films had improved bonding strength due to the addition of nanosilica, even though the bonding strength was lower than that of the TPU hot-melt films. Specifically, when the nanosilica content was 1.0 to 3.0 phr, good results could be obtained. When the nanosilica content was more than 5 phr, problems arose in that the bonding strength decreased and blooming occurred on the surface, like the case of the TPU hot-melt films. At nanosilica contents of 4.0 phr and 5.0 phr, the bonding strength did not decrease compared to that of conventional thermoplastic hot-melt film.

Meanwhile, Table 4 below shows the results of a second adhesion test (no-sew pressing) performed using each resin film having a further decreased nanosilica content, like the case of the TPU hot-melt film.

As can be seen in Table 4 above, at nanosilica contents of 0.1 phr and 0.3 phr, the bonding strength was improved compared to that of conventional hot-melt films containing no nanosilica, even though the bonding strength was somewhat unstable. At a nanosilica content of 0.5 phr or more, the bonding strength was similar to that of the products having a nanosilica content of 1.0 phr or more.

As described above, when the EVA hot-melt films, the polyamide hot-melt films and the polyester hot-melt films had a nanosilica content of 1.0 to 3.0 phr, the best effect could be obtained. In addition, even at a nanosilica content of 0.1 to 1.0 phr, the hot-melt films showed an improved adhesive effect compared to that of conventional hot-melt films. When the nanosilica content was more than 5.0 phr, the bonding strength was not inferior to that of conventional hot-melt films, even though slight problems arose. Thus, it

TABLE 4

| No. | Film name | Thickness (mm) | Nanosilica content (phr) | Engineered mesh adhesion (kgf/cm) | Sandwich mesh adhesion (kgf/cm) | Tfb (° C.) | MI (g/10 min) |
|---|---|---|---|---|---|---|---|
| 1 | EVA hot-melt films | 0.20 | | ①-0.64/②-0.85/③-0.75/④-0.80 | ①-0.73/②-0.89/③-0.94/④-0.84 | 115.5 | 13.2 |
| 2 | | | 0.1 | ①-0.86/②-0.86/③-0.92/④-1.00 | ①-0.83/②-0.93/③-1.01/④-1.03 | 115.2 | 13.1 |
| 3 | | | 0.3 | ①-1.19/②-1.14/③-1.08/④-1.20 | ①-1.01/②-1.02/③-1.17/④-1.25 | 115.8 | 12.5 |
| 4 | | | 0.5 | ①-1.22/②-1.35/③-1.18/④-1.15 | ①-1.20/②-1.23/③-1.33/④-1.23 | 116.2 | 11.8 |
| 5 | | | 0.7 | ①-1.27/②-1.10/③-1.37/④-1.36 | ①-1.18/②-1.33/③-1.22/④-1.40 | 118.1 | 11.3 |
| 6 | | | 1.0 | ①-1.26/②-1.25/③-1.21/④-1.32 | ①-1.22/②-1.30/③-1.28/④-1.45 | 119.4 | 10.8 |
| 7 | Polyamide hot-melt films | 0.20 | | ①-0.34/②-0.35/③-0.62/④-0.63 | ①-0.63/②-0.53/③-0.67/④-0.54 | 112.2 | 10.3 |
| 8 | | | 0.1 | ①-0.56/②-0.66/③-0.68/④-0.72 | ①-0.76/②-0.78/③-0.75/④-0.78 | 112.3 | 10.1 |
| 9 | | | 0.3 | ①-0.69/②-0.82/③-0.72/④-0.75 | ①-0.80/②-0.76/③-0.74/④-0.85 | 113.5 | 9.8 |
| 10 | | | 0.5 | ①-0.81/②-0.85/③-0.88/④-0.87 | ①-0.95/②-0.93/③-0.86/④-0.88 | 113.8 | 9.6 |
| 11 | | | 0.7 | ①-0.87/②-1.02/③-0.97/④-0.98 | ①-0.98/②-0.94/③-1.11/④-1.20 | 113.9 | 9.7 |
| 12 | | | 1.0 | ①-0.89/②-0.98/③-1.03/④-1.02 | ①-1.05/②-1.21/③-1.05/④-1.11 | 114.2 | 9.5 |
| 13 | Polyester hot-melt films | 0.20 | | ①-1.88/②-1.87/③-1.95/④-2.10 | ①-1.78/②-1.85/③-1.94/④-1.87 | 118.2 | 12.5 |
| 14 | | | 0.1 | ①-2.08/②-2.06/③-2.22/④-2.11 | ①-1.96/②-1.85/③-2.00/④-2.03 | 118.4 | 12.2 |
| 15 | | | 0.3 | ①-2.19/②-2.22/③-2.28/④-2.10 | ①-2.00/②-2.02/③-2.01/④-2.14 | 118.6 | 12.0 |
| 16 | | | 0.5 | ①-2.25/②-2.35/③-2.42/④-2.26 | ①-2.25/②-2.18/③-2.33/④-2.41 | 118.5 | 12.1 |
| 17 | | | 0.7 | ①-2.31/②-2.25/③-2.39/④-2.45 | ①-2.13/②-2.33/③-2.38/④-2.55 | 119.1 | 11.7 |
| 18 | | | 1.0 | ①-2.38/②-2.37/③-2.55/④-2.65 | ①-2.36/②-2.55/③-2.48/④-2.60 | 119.5 | 11.6 | was confirmed through the tests that when the hot-melt film was manufactured to have a nanosilica content of 0.1 to 5.0 phr, the object and effect of the present invention could be achieved.

As described above, according to the present invention, nanosilica is added during the manufacture of a thermoplastic hot-melt film. Thus, the manufactured thermoplastic hot-melt film may have excellent bonding strength even at a thickness which is about 20-25% thinner than that of a conventional hot-melt film (0.2 mm or more). In addition, the manufacturing cost can be reduced, and it is possible to prevent fabrics from becoming hard after no-sew pressing and to give a soft feeling compared to conventional one.

Furthermore, the thermoplastic hot-melt film according to the present invention can be distributed uniformly on the surfaces of fabrics without excessively penetrating into one of the fabrics after melting by heat and pressure during no-sew pressing even if the yarn density of the fabrics is high or low or even if the size of fabric holes is large or small. Specifically, the thermoplastic hot-melt film according to the present invention can be distributed uniformly on the surfaces of fabrics without excessively penetrating into one of the fabrics, which has a relatively low yarn density or a relatively large hole diameter, thereby increasing the adhesion between the fabrics.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A thermoplastic hot-melt film having excellent bonding strength, which consists of any one composition selected from the group consisting of thermoplastic polyurethane, ethylene vinyl acetate, polyamide, and polyester compositions, wherein the thermoplastic hot-melt film further contains nanosilica,
wherein a content of the nanosilica is 0.1 to 5.0 Parts per Hundred Resin (phr) and a size of the nanosilica is less than 100 nm.

2. The thermoplastic hot melt film of claim 1, wherein a thickness of the thermoplastic hot-melt film is in a range of 0.1-0.2 mm.

3. A thermoplastic hot-melt film having excellent bonding strength, which consists of any one composition selected from the group consisting of thermoplastic polyurethane, ethylene vinyl acetate, polyamide, and polyester composition, wherein the thermoplastic hot-melt film further contains nanosilica,
wherein a content of the nanosilica is 0.1 to 5.0 Parts per Hundred Resin (phr) and a size of the nanosilica is less than 100 nm, and
wherein a thickness of the thermoplastic hot-melt film is in a range of 0.1-0.2 mm.

4. A fabric product, the fabric product comprising: an upper;
a lining fabric bonded to the upper; and
a thermoplastic hot-melt film is layered between the upper and the lining fabric for bonding the upper and the lining fabric,
wherein the thermoplastic hot-melt film consists of the composition selected from the group consisting of thermoplastic polyurethane, ethylene vinyl acetate, polyamide and polyester compositions, wherein the thermoplastic hot-melt film further contains nanosilica,
wherein a content of the nanosilica is 0.1 to 5.0 Parts per Hundred Resin (phr) and a size of the nanosilica is less than 100 nm.

5. The fabric product of claim 4, wherein a thickness of the thermoplastic hot-melt film is in a range of 0.1-0.2 mm.

6. The fabric product of claim 4, wherein the upper is an engineered mesh.

7. The fabric product of claim 4, wherein the upper is a sandwich mesh.

8. A footwear comprising the fabric product of claim 4.

9. A fabric product, the fabric product comprising:
a first fabric;
a second fabric bonded to the first fabric; and
a thermoplastic hot-melt film is layered between the first fabric and the second fabric for bonding the first fabric and the second fabric,
wherein the thermoplastic hot-melt film consists of the composition selected from the group consisting of thermoplastic polyurethane, ethylene vinyl acetate, polyamide and polyester compositions, wherein the thermoplastic hot-melt film contains nanosilica,
wherein a content of the nanosilica is 0.1 to 5.0 Parts per Hundred Resin (phr) and a size of the nanosilica is less than 100 nm.

10. The fabric product of claim 9, wherein a thickness of the thermoplastic hot-melt film is in a range of 0.1-0.2 mm.

11. The fabric product of claim 9, wherein the first fabric is an engineered mesh.

12. The fabric product of claim 9, wherein the first fabric is a sandwich mesh.

13. The fabric product of claim 9, wherein the second fabric is a lining fabric.

14. A footwear comprising the fabric product of claim 9.

15. An apparel comprising the fabric product of claim 4.

* * * * *